United States Patent [19]

Watt

[11] Patent Number: 5,025,160

[45] Date of Patent: Jun. 18, 1991

[54] MEASUREMENT OF FLOW VELOCITY AND MASS FLOWRATE

[75] Inventor: John S. Watt, New South Wales, Australia

[73] Assignee: Commonwealth Scientific and Industrial Research Organisation, Australia

[21] Appl. No.: 359,377

[22] Filed: May 31, 1989

[30] Foreign Application Priority Data

Jun. 3, 1988 [AU] Australia .................................... 8611

[51] Int. Cl.$^5$ .............................................. G01F 1/00
[52] U.S. Cl. ................................................. 250/356.1
[58] Field of Search ...................................... 250/356.1

[56] References Cited

U.S. PATENT DOCUMENTS

| 4,228,353 | 10/1980 | Johnson | 250/356.1 |
| 4,282,433 | 8/1981 | Löffel | 250/356.1 |
| 4,301,400 | 11/1981 | Paap | 324/58.5 A |

FOREIGN PATENT DOCUMENTS

| 2652872 | 5/1978 | Fed. Rep. of Germany | 250/356.1 |
| 2083908 | 3/1982 | United Kingdom . | |
| 2088050 | 6/1982 | United Kingdom . | |

OTHER PUBLICATIONS

Beck, M. S., Plaskowski, A., "Cross Correlation Flowmeters", Adam Hilger, Bristol, 1987, pp. 23, 26, 27 and 103.

Beck et al., "On-Line Measurement of Oil/Gas/Water Mixtures, Using a Capacitance Sensor", vol. 3, No. 1, Jan.-Mar. 1985, pp. 7-14.

Fanger et al., "Nuclear Techniques and Mineral Resources 1977", Mar. 7-10, 1977, pp. 539-550.

Abouelwaffa et al., "The Measurement of Component Ratios in Multiphase Systems Using Gamma-Ray Attenuation", 1980, pp. 341-345.

Tomada et al., "Development of Gamma-Ray Oil/Water/Gas Fraction Meter for Crude Oil Production Systems", Sep. 22-23, 1987, pp. 1-21.

Stuchly et al., "Advances in Monitoring of Velocities and Densities of Particulates Using Microwave Doppler Effect", Mar. 1977, vol. IM-26, No. 1, pp. 21-24.

Liu et al., "Net-Oil Computer Improves Water-Cut Determination", Dec. 1988, pp. 41-45.

*Primary Examiner*—Constantine Hannaher

[57] ABSTRACT

Time varying measurements indicative of the ratio of mass absorption coefficients of the components of a multiphase flow containing at least two liquid phases at two spaced apart locations are cross correlated to determine liquid flow velocity. The time varying measurements are provided by measuring the intensities of gamma-rays transmitted through a selected volume of the flow at two different gamma-ray energies. At least one of the gamma-ray energies has substantially different mass absorption coefficients in each of the two liquids. Gas velocity, when gas is present, and component fractions of all components are determined using a dual energy gamma-ray transmission technique and with the liquid flow velocity are used to derive mass flowrates.

22 Claims, 4 Drawing Sheets

MEASUREMENT OF FLOW VELOCITY AND MASS FLOWRATE

BACKGROUND OF THE INVENTION

1. Field of the Invention

This invention relates to measurement of the liquid flow velocities and liquid mass flowrates in a multiphase flow containing at least two liquid phases. As used herein the term "phase" is intended to refer to separate immiscible liquid phases such as oil and water as well as liquid and gas phases. As used herein the term "multiphase" is intended to refer to a mixture including at least two such phases.

Determination of mass flowrate of components in a flow requires a knowledge of the respective flow velocity of each phase. As used herein the term "velocity" is intended to refer to mean flow velocity in the flow direction, for example along a tube. Hitherto the accurate measurement of flow velocity of liquid phases in a flow has proved difficult and has hampered the development of mass flowrate measurement techniques.

2. Description of the Prior Art

Measurement of the mass flowrates of components of flows containing several phases is desirable in many fields but is of particular importance in the oil industry.

Crude oil production is normally accompanied by gaseous hydrocarbons and water. These three components are piped from the oil well as a multiphase mixture. The mass flow rate measurement of the oil, water and gas from individual oil wells is important for better reservoir management, better production allocation, and optimisation of total oil production over the field life. Normally, the required accuracy of determination of mass flow of each component is 5%.

Additionally, there is often a need to measure the relative concentrations of oil and water in a flow after separation of the gas and some of the water. This measurement can present considerable practical difficulty particularly where the densities of the oil and water are the same or similar.

Current practice for the measurement of mass flowrate of the components of oil well flows is to periodically physically divert the well output to a test separator. After separation the flow rate of each component is measured with conventional devices such as orifice or turbine flow meters. There are several inherent disadvantages associated with this technique. Firstly, accurate measurement requires stabilised well flow which can take some time to establish. Often testing the output of a single well may take a whole day. In addition, the physical size of the separator and associated equipment occupies significant space which can lead to increased costs on off-shore platforms. Finally, in practice it is not feasible to provide each well with its own test separator system and often many wells share a common facility. Continuous monitoring of the output of each well is therefore not possible.

Various techniques have been suggested for on-line mass flow measurement of multiphase mixtures. Most depend on determination of the concentration of one or more of the components coupled with a determination of either the mean velocity of one or more of the components or the total mass flow of the mixture. Concentration measurement by capacitance is described in a paper entitled "On-line measurement of oil/water/gas mixtures using a capacitance sensor" by Beck M. S. Green R. G., Hammer E. A. and Thorn R, Measurement 3 (1) 7–14 (1985). Measurement of component concentration using a dual energy gamma-ray transmission technique has also been described by the following:

Fanger U., Pepelnik R. and Michaelis W.—Determination of conveyor-flow parameters by gamma-ray transmission analysis, pp. 539–550 in Nuclear Techniques and Mineral Resources 1977, IAEA, Vienna, 1977.

Michaelis W. and Fanger H. U.—Device for determining the proportions by volume of a multiple-component mixture, U.K. Patent Application GB2083908 A, 1982.

Abouelwafa M.S.A. and Kendall E.J.M.—The measurement of component ratios in multiphase systems using gamma-ray attenuation, J.Phys.E.: Sci. Instrum, 131 341–345 (1980).

Kendell E.J.M.—Gamma-ray analysis of multicomponent material, U.K. Patent Application GB 2088050 A, 1982.

Tomada T., Komaru M., Badono S., Tsumagari K. and Exall D.—Development of gamma-ray oil/water/gas fraction meter for crude oil production systems, Paper presented at the International Conference on Industrial Flow Measurement On-shore and Off-shore, 22–23/9/87, London.

Microwave measurement of component concentration is also known from U.S. Pat. No. 4,301,400. Neutron inelastic scatter techniques have also been used.

Velocity is usually determined by measuring the time taken for the fluid to flow between two sensors, one downstream of the other, by cross-correlation of the output signals of the two sensors, and combining this with the distance between the two sensors. This technique is described in Beck M. S. and Plaskowski A.—Cross Correlation Flowmeters, Adam Hilger, Bristol, 1987. Doppler measurements are an alternative technique to determine velocity and have been described by Stuchly S. S., Sabir M. S. and Hamid A.—Advances in monitoring of velocities and densities of particulates using microwave Doppler effect, IEEE Trans. Instrumentation and Measurement IM-26 (1) 21–24. The mass flow of a two component mixture such as oil and water can be determined by a gauge depending on Coriolis force. This is described by Liu K. T. and Revus D. E.—Net-oil computer improves water-cut determination, Oil and Gas Journal pp. 41–45, 19 Dec. 1988.None of these techniques fully solves the requirement for accurate on-line determination of mass flow rate of each separate component of a multiphase flow.

SUMMARY OF THE INVENTION

It is an object of this invention to provide methods and apparatus for measuring liquid flow velocity and mass flowrates of a multiphase flow containing at least two liquids which will at least ameliorate one or more of the above disadvantages.

Accordingly, in a first aspect this invention consists in a method for measuring liquid flow velocity of a multiphase flow containing at least two liquid phases, said method comprising the steps of:

(i) passing said flow through a tube;

(ii) measuring at a first location the intensities of gamma-rays transmitted through a selected volume of said flow at two different gamma-ray energies, at least one of said gamma-ray energies having substantially different mass absorption coefficients in each of said two liquids to obtain a time varying measurement indicative of the ratio of the mass absorption co-efficients of the selected volume at said energies;

(iii) measuring at a second location spaced from the first in the direction of said flow the intensities of gamma-rays transmitted through a corresponding volume of said flow at said two different gamma-ray energies to obtain a time varying measurement indicative of the ratio of the mass absorption co-efficients of said corresponding volume at said energies;

(iv) cross correlating the time varying measurements obtained at said first and second locations to derive a liquid flow transit time and (v) calculating said liquid flow velocity from the transit time and the spacing of said first and second location.

In a second aspect this invention consists in an apparatus for measuring liquid flow velocity of a multiphase flow containing at least two liquid phases, said apparatus comprising a tube through which said flow is passed; first gamma-ray transmission means to measure at a first location the intensities of gamma-rays transmitted through a selected volume of said flow at two different gamma-ray energies, at least one of said gamma-ray energies having substantially different mass absorption coefficients in each of said two liquids to obtain a time varying measurement indicative of the ratio of the mass absorption co-efficients of the selected volume at said energies; second gamma-ray transmission means to measure at a second location spaced from the first in the direction of said flow the intensities of gamma-rays transmitted through a corresponding volume of said flow at said two different gamma-ray energies to obtain a time varying measurement indicative of the ratio of the mass absorption co-efficients of said corresponding volume at said energies; means to cross correlate the time varying measurements obtained at said first and second locations to produce a liquid flow transit time and to calculate said liquid flow velocity from the transit time and the spacing of said first and second locations.

In a third aspect this invention consists in a method for measuring the liquid mass flowrates of a multiphase flow containing at least two liquid phases, said method comprising the steps of:

(i) passing said flow through a tube;

(ii) measuring at a first location the intensities of gamma-rays transmitted through a selected volume of said flow at two different gamma-ray energies, at least one of said gamma-ray energies having substantially different mass absorption coefficients in each of said two liquids to obtain a time varying measurement indicative of the ratio of the mass absorption co-efficients of the selected volume at said energies;

(iii) measuring at a second location spaced from the first in the direction of said flow the intensities of gamma-rays transmitted through a corresponding volume of said flow at said two different gamma-ray energies to obtain a time varying measurement indicative of the ratio of the mass absorption co-efficients of said corresponding volume at said energies;

(iv) cross correlating the time varying measurements obtained at said first and second locations to derive a liquid flow transit time and (v) calculating the liquid flow velocity from the transit time and the spacing of said first and second location.

(vi) determining the component fractions of each liquid phase in said flow and calculating each liquid mass flowrate from said liquid flow velocity and component fractions.

In a fourth aspect this invention consists in an apparatus for measuring the liquid mass flowrates of a multiphase flow at least two liquid phases, said apparatus comprising:

a tube through which said flow is passed; first gamma-ray transmission means to measure at a first location the intensities of gamma-rays transmitted through a selected volume of said flow at two different gamma-ray energies, at least one of said gamma-ray energies having substantially different mass absorption coefficients in each of said two liquids to obtain a time varying measurement indicative of the ratio of the mass absorption co-efficients of the selected volume at said energies; second gamma-ray transmission means to measure at a second location spaced from the first in the direction of said flow the intensities of gamma-rays transmitted through a corresponding volume of said flow at said two different gamma-ray energies to obtain a time varying measurement indicative of the ratio of the mass absorption co-efficients of said corresponding volume at said energies; means to cross correlate the time varying measurements obtained at said first and second locations to produce a liquid flow transit time and to calculate the liquid flow velocity from the transit time and the spacing of said first and second locations;

and means to determine the component fractions of each liquid phase in said flow and calculate each liquid mass flowrate from said flow velocity and component fractions.

For preference the cross correlation is performed in respect of a time varying measurement of $$R = \frac{\ln(I'/I_o')}{\ln(I''/I_o'')}$$

where $I'$ = intensity of gamma-rays of a first energy passing through the selected volume of flow $I_o'$ = intensity of gamma-rays of the first energy passing through the selected volume with the tube empty $I''$ = intensity of gamma-rays of a second higher energy passing through the selected volume of flow $I_o''$ = intensity of gamma-rays of the second higher energy passing through the selected volume with the tube empty.

The selected volume of the flow can vary from a relatively narrow volume across the tube to a volume including substantially a full cross-section of the tube.

In the measurement of mass flowrates the component fractions of each liquid phase are preferably determined by means of the dual energy gamma-ray transmission technique which will be described below.

The invention will now be described, by way of example only, with reference to the accompanying drawings.

DESCRIPTION OF THE PREFERRED EMBODIMENTS

In the following description the invention is described with reference to its application to a flow containing water, oil, and gas.

The measurement of gamma-ray absorption of a selected volume of material at two different gamma-ray energies is generally referred to as a dual energy gamma-ray transmission technique.

The dual energy gamma-ray transmission technique depends on the measurement of the transmission of gamma-rays, at two different energies, through the sample to be analysed. If the gamma-ray path length in the sample is constant, for example, across a diameter such as for oil, water and gas in a pipeline, calculations show that the volume fractions of the three components can be determined from the transmission measurements by solving the equations $$I' = I_o' \exp[-(\mu_{oil}'\rho_{oil}x_{oil} + \mu_{water}'\rho_{water}x_{water} + \mu_{gas}'\rho_{gas}x_{gas})] \quad (1)$$

$$I'' = I_o'' \exp[-(\mu_{oil}''\rho_{oil}x_{oil} + \mu_{water}''\rho_{water}x_{water} + \mu_{gas}''\rho_{gas}x_{gas})] \quad (2)$$

$$D = x_{oil} + x_{water} + x_{gas} \quad (3)$$

where:
$I', I_o', I'', I_o''$
are as defined above, and
$\mu_{water}'$ = mass absorption co-efficient for water of gamma-rays of the first energy
$\mu_{water}''$ = mass absorption co-efficient for water of gamma-rays of the second energy
$\mu_{oil}'$ = mass absorption co-efficient for oil of gamma-rays of the first energy
$\mu_{oil}''$ = mass absorption co-efficient for oil of gamma-rays of the second energy.
D = internal diameter of the pipe,
$x_{oil}, x_{water}, x_{gas}$ = length of respective component transversed by the gamma ray beam in the pipe
$\rho_{oil}, \rho_{water}, \rho_{gas}$ = respective densities of components
$\mu_{gas}', \mu_{gas}''$ = respectively mass absorption co-efficients for gas of gamma-rays of the first and second energies.

These equations can be solved to give volume fractions of:

$$\text{oil} = \frac{(x_{oil})}{D} \quad \text{water} = \frac{(x_{water})}{D} \quad \text{and gas} = \frac{(x_{gas})}{D}$$

The velocity of the gas bubbles can be determined in a known manner by cross-correlation of the detected intensities of transmitted gamma-rays. This requires only single energy gamma-ray transmission systems, spaced apart along the flow, although the measurements at one of the energies of spaced dual gamma-ray transmission systems can be used or even a dual energy system and a spaced apart single energy system can be used. The time delay determined by the cross correlation, and the distance between the gamma-ray beams from the two systems along the pipe, are combined to give the velocity of the bubbles of gas.

The velocity of the liquids (oil and water) will often be less than that of the gas. It is unlikely that the velocity of the liquid (oil and water) can also be obtained from the correlation techniques described in the previous paragraph because the main changes in transmitted intensities are due to changes in the bulk density of the oil/water/gas mixture. That is, due to changes in the overall gas bubble volume. Hence the much smaller changes in density of the oil/water liquid are likely to be masked by the much larger changes in gas volume.

This invention proceeds from the realisation that a specific use of the detected gamma-ray intensities measured in dual energy gamma-ray transmission techniques provides a measurement which is sensitive to the weight fraction ratio of oil to water and substantially insensitive to variation of gas volume in the three phase mixture, and that this measurement can be used to determine the velocity of the oil and water mixture.

The mathematical basis for the invention can be summarised as follows.

Consider the general case of dual energy gamma-ray transmission but expressing the equations differently than in equations (1) to (3) above. The weight fraction C of each component, and the ratio R, are given by $$C_{oil} + C_{water} + C_{gas} = 1 \quad (4)$$

$$R = \frac{\ln(I'/I_o')}{\ln(I''/I_o'')} \quad (5)$$

The mass absorption coefficients $\mu'$ and $\mu''$ respectively of the lower and higher energy gamma-rays in the three phase mixture of oil, water and gas are given by $$\mu' = \mu_{oil}'C_{oil} + \mu_{water}'C_{water} + \mu_{gas}'C_{gas} \quad (6)$$

$$\mu'' = \mu_{oil}''C_{oil} + \mu_{water}''C_{water} + \mu_{gas}''C_{gas} \quad (7)$$

Equations (4) to (7) can be combined to give $$C_{oil} = \frac{\{(\mu_{water}' - R\mu_{water}'') + [(\mu_{gas}' - \mu_{water}') - R(\mu_{gas}'' - \mu_{water}'')]C_{gas}\}}{(\mu_{oil}' - \mu_{water}') - R(\mu_{oil}'' - \mu_{water}'')} \quad (8)$$

$$C_{water} = \frac{\{(\mu_{oil}' - R\mu_{oil}'') + [(\mu_{gas}' - \mu_{oil}') - R(\mu_{gas}'' - \mu_{oil}'')]C_{gas}\}}{(\mu_{oil}' - \mu_{water}') - R(\mu_{oil}'' - \mu_{water}'')} \quad (9)$$

The gas weight fraction $C_{gas}$ in equations (8) and (9) is small compared with the oil and water weight fractions. It can be shown by substituting appropriate values of parameters equations (8) and (9) that the oil weight fraction $C_{oil}$ and water weight fraction $C_{water}$ depend only slightly on changes in the gas. Hence $C_{oil}$ and $C_{gas}$ are approximately a function of R as given in equations (8) and (9). This relationship is substantially unaltered even if there is no gas present.

Thus, R, which can be determined experimentally according to equation (5) provides, a measure of $C_{oil}$ and $C_{water}$.

Time varying measurements of R using a dual energy gamma-ray transmission technique at two locations spaced apart by a known distance can be cross correlated to provide a transit time between the locations. Transit time spacing of the locations enable a calculation of velocity of the oil water mixture. The mean velocity of the mixture thus obtained is a sufficiently accurate estimate of the separate oil velocity and water velocity to give mass flowrate measurements of the generally required accuracy.

From a knowledge of liquid velocity the mass flowrates can be calculated by using the volume fractions obtained from dual energy gamma-ray transmission measurements at one or both of the locations as described above and the density of the oil and water in the flow which are determined using known techniques. Gas velocity can be determined using the same system according to the technique described above. Gas volume can be determined from the gas component fraction, measured as described above, and using a knowledge of temperature and pressure the gas mass flowrate can be calculated. That is, an arrangement comprising two dual energy gamma-ray transmission systems can be used to determine mass flow rate of each component.

Figure 1:
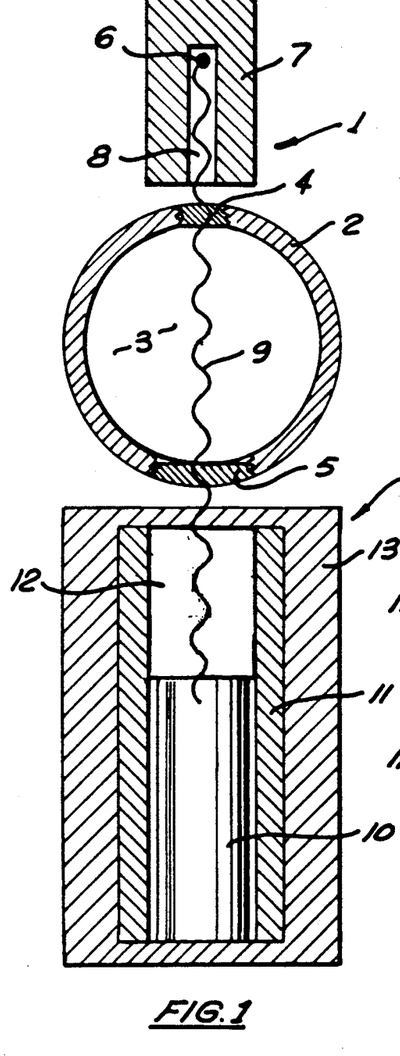
FIG. 1 is a schematic sectional elevation of a dual energy gamma-ray transmission assembly forming part of an apparatus according to this invention.
Figure 2:
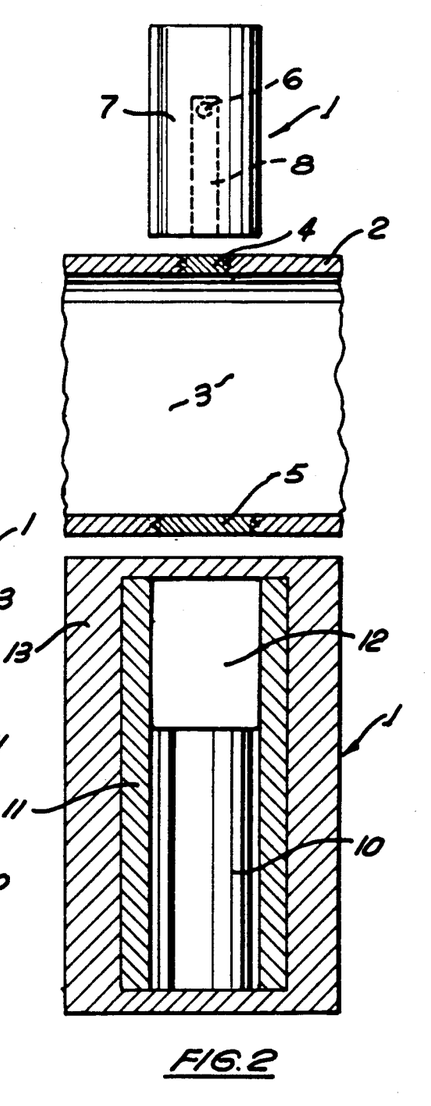
FIG. 2 is an end elevation of the assembly shown in FIG. 1.

FIGS. 1 and 2 show a dual energy gamma-ray transmission assembly 1 forming part of a first embodiment of an apparatus to measure flow velocity and mass flowrate of each component in an oil, water and gas mixture. The assembly 1 comprises a tube 2 through which the mixture 3 is passed. The tube 2 is provided with diametrically opposed windows 4, 5 formed of a low atomic number material so that low energy gamma-rays can pass therethrough without substantial attenuation. The windows must transmit a substantial fraction of the low energy gamma-rays, and be able to withstand pressures up to 5000 Psi and temperatures up to 150° C. occurring in some pipelines carrying oil, water and gas mixtures. As an alternative the whole pipe over the cross-section may be made of the low atomic number material. Window 5 is of a larger size than window 4 to allow for some divergence of a gamma-ray beam as it passes through the flow 3. Two radioisotope gamma-ray sources 6 are located adjacent window 4 and surrounded by shielding 7 of a suitable gamma-ray absorbing material. The source is any suitable radioisotope or combination of radioisotopes which produce gamma-rays of two different energies with at least one of the gamma-ray energies having substantially different mass absorption co-efficients in each of oil and water. Suitable sources include:

(i) $^{241}$Am and $^{133}$Ba which produce gamma-rays with energies of 59.5 keV and around 356 keV; and (ii) $^{241}$Am and $^{137}$Cs which produce gamma-rays with energies of 59.5 KeV and 663 keV.

(iii) $^{241}$Am above for small diameter pipes by utilising both the 59.5 keV and lower energy emissions.

Other well known radioisotope sources emitting low energy gamma-rays can also be used either with $^{241}$Am or separately. It will be apparent that it is not essential for both of the gamma-ray sources to be completely mono-energetic.

The gamma-ray sources are placed at the end of a passage 8 in shielding 7 so that a relatively narrow beam of gamma-rays 9 is produced.

A scintillation detector 10 is disposed adjacent window 5 to detect the intensities of both energy gamma-rays in the beam 9. Suitable scintillators are sodium iodide and other well-known scintillator materials. For best gain stability, the scintillator and photomultiplier are temperature controlled to within about 1° C., and gain stabilised electronics (not shown) are provided. Shielding 11 of suitable gamma-ray absorbing material surrounds scintillation detector 10 and a cylindrical passage 12 is provided in the shielding 11 to allow the beam 9 to reach the detector. Thermal insulation 13 of suitable known type is provided around the shielding 11 to minimise the heat from the oil/water/gas mixture reaching the scintillator and help maintain the temperature stability of the detector. In some applications it is necessary to use a heat pipe to minimise the rise in temperature of the scintillator. Temperature of the scintillation detector is preferably controlled by use of a small electric heating element (not shown) inside the thermal insulation 13 together with a temperature sensing device such as a thermistor (not shown) and a control device (not shown) for the supply of power to the heating element.

Figure 3:
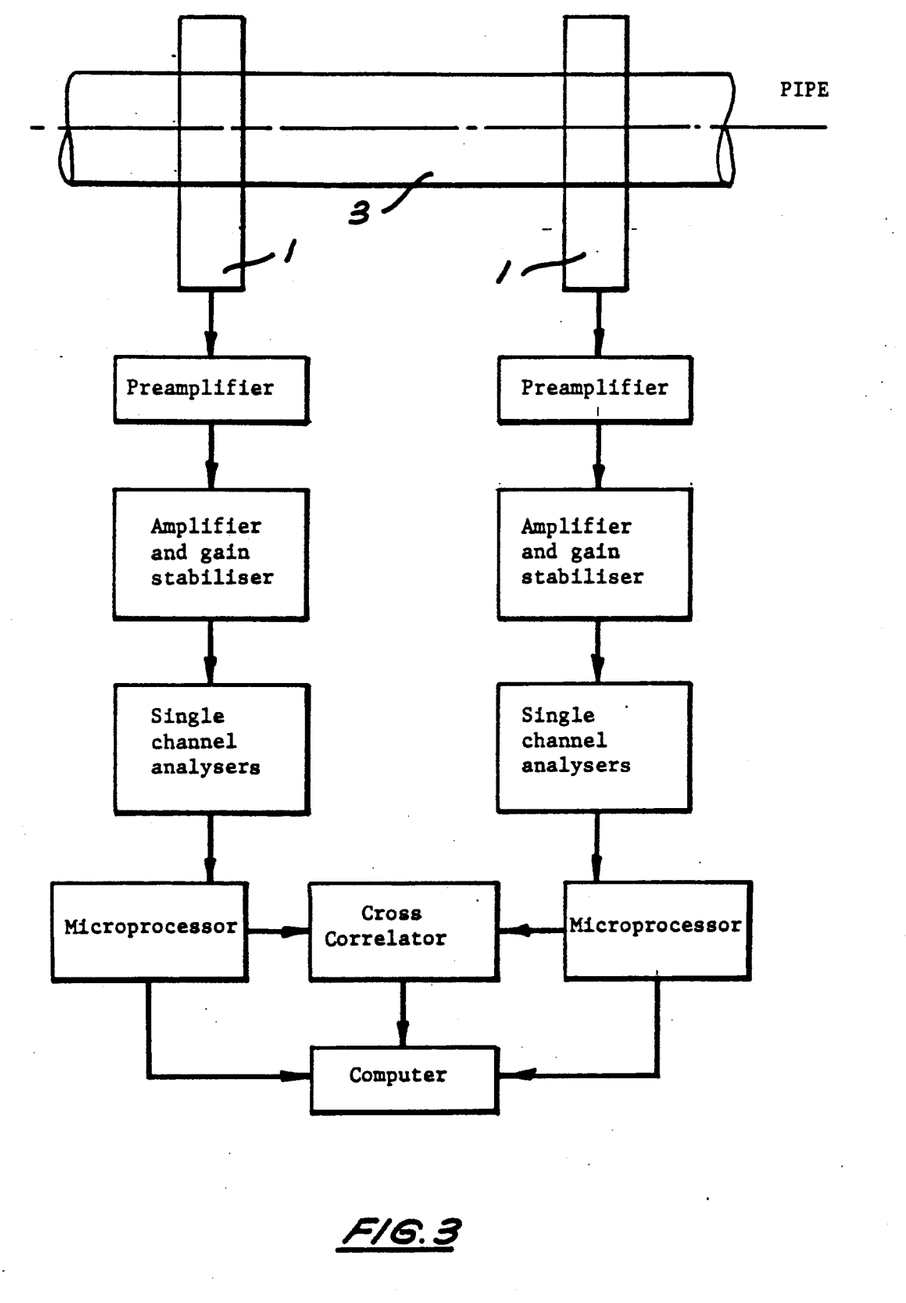
FIG. 3 is a schematic block diagram of the signal processing equipment forming part of the apparatus according to this invention.

The assembly 1 shown in FIGS. 1 and 2 is provided at two locations spaced apart by a known distance in the direction of the flow at each location. FIG. 3 schematically shows the location of two assemblies 1 and the signal processing equipment used in the apparatus.

As shown in FIG. 3 the outputs of the scintillation detectors are amplified by a preamplifier and an amplifier and gain stabilizer. The signals are then analysed using either two single channel analysers as shown or a multichannel analyser so that the detected intensities at the two gamma-ray energies can be separately measured. The single channel analysers or multichannel analyser are gated so that counts over short time intervals, for example in the range 1 to 50 milliseconds, can be measured. In some applications where there are small changes in count rates during the counting interval the use of short counting intervals is not necessary. A microprocessor calculates the value of R according to equation (5), corresponding to each selected time interval. A cross correlator of known type is used to cross-correlate the calculated values of R from each channel to determine the time delay in passage of the oil/water between the two gamma-ray beams. A computer inputs signals from the cross correlator and each microprocessor. The computer is used to calculate:

(i) the velocity of flow of the liquid from the time delay and the known distance between the two gamma-ray beams;

(ii) the mean volumes of oil, water and gas over the cross section of the pipe from the ratio of the intensities of the two gamma-ray beams of different energies as described above; and (iii) the mass flow rate of each component from (i) and (ii).

FIGS. 4 to 7 show alternate embodiments of the apparatus to measure flow velocity and mass flowrate. The same reference numerals have been used to identify similar parts. Only the features of these embodiments which differ from that described above will be discussed in detail.

Figure 4:
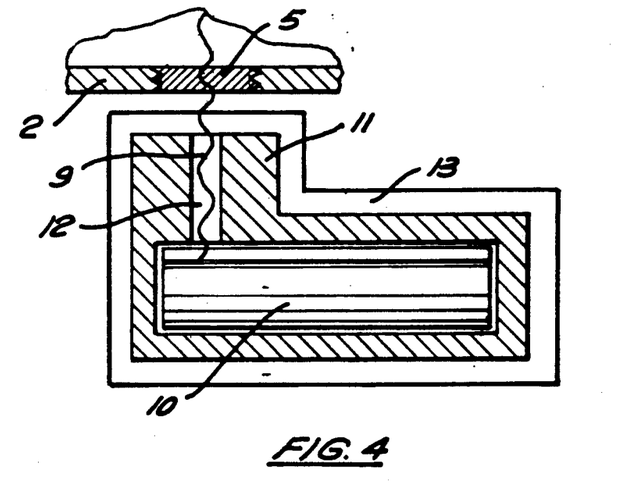
FIG. 4 is a view similar to FIG. 1 showing a first alternate embodiment of the dual energy gamma-ray transmission assembly.

FIG. 4 shows a geometrical arrangement of a scintillation detector 10, detector collimators or shielding 11 and thermal insulation 13 which can be used to replace that in FIGS. 1 and 2. The main advantage of this alternative geometry is that it is more compact than that in FIGS. 1 and 2.

Figure 5:
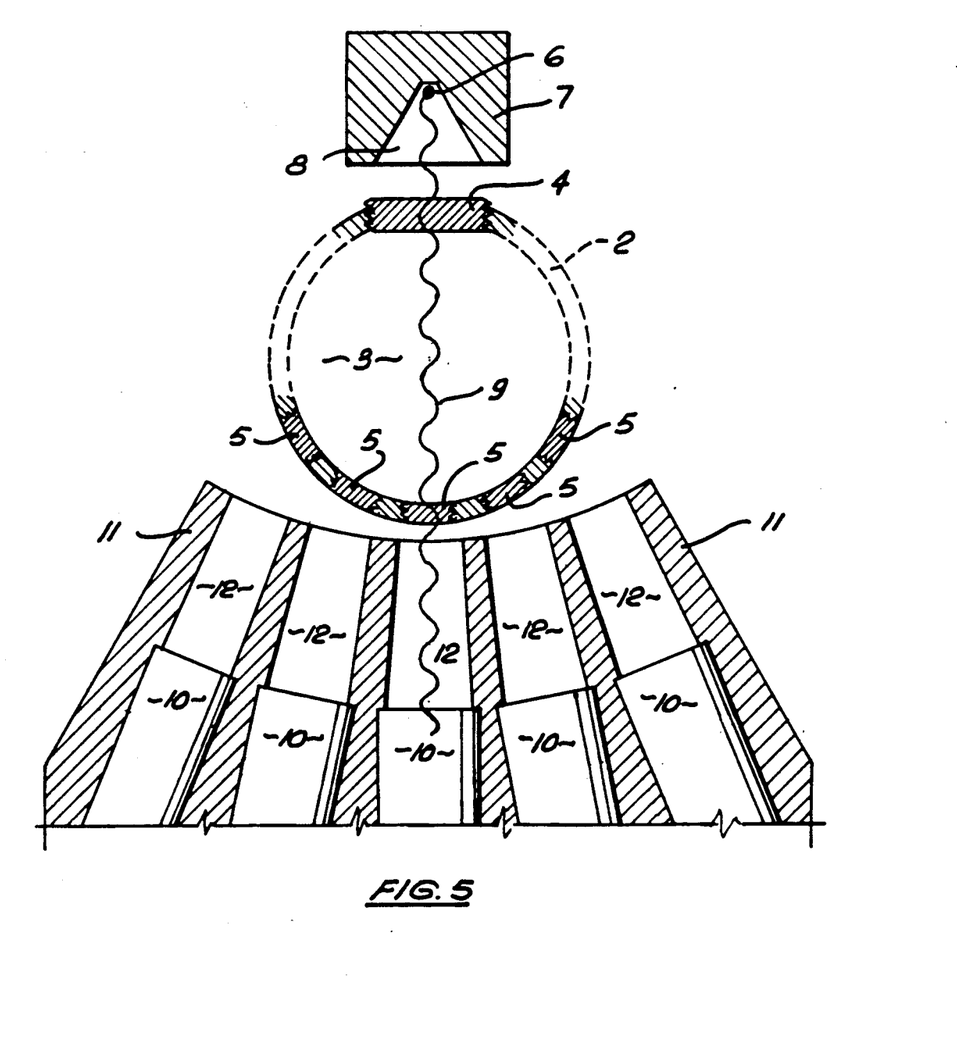
FIG. 5 is a view similar to FIG. 1 showing a second alternate embodiment of the dual energy gamma-ray transmission assembly.

FIG. 5 shows the major features of a second embodiment of an apparatus to measure flow velocity of the liquid component in an oil/water/gas mixture. This embodiment utilises a number of dual energy gamma-ray transmission assemblies, but with a common set of two radioisotope sources 6, to scan different parts of the pipe cross-section. This is necessary when the oil/water/gas mixture is heterogeneous over the cross-section of the pipe. The gamma-ray beam is relatively broad over the cross-section of pipe shown, but is narrow along the length of the pipe as for the arrangement in FIGS. 1 and 2. As shown five spaced apart scintillation detectors 10 separated by shielding 11 forming collimator systems are employed. By arranging the detectors and collimators around an arc and providing additional windows 5 gamma-rays from source 6 reach each of the detectors 10. The operation of the FIG. 5 embodiment is for practical purposes the same as for the first embodiment save for the processing of several channels of data. Thermal insulation, although not shown, can be used to surround the detector and the collimator systems.

Figure 6:
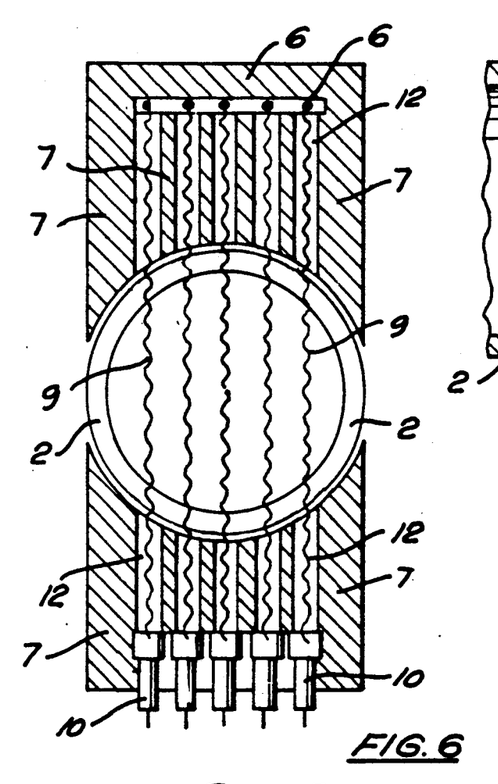
FIG. 6 is a view similar to FIG. 1 showing a third alternate embodiment of the dual energy gamma-ray transmission assembly.

FIG. 6 shows the major features of a third embodiment of an apparatus to measure flow velocity of the liquid component in an oil/water/gas mixture. This embodiment utilises a number of dual energy gamma-ray transmission assemblies to scan different parts of the pipe cross-section, necessary when the oil/water/gas mixture is heterogeneous over the cross-section of pipe. In this arrangement a number of gamma-ray sources 6 are arranged in a linear array with shielding 7 forming a number of parallel collimator systems. A similar linear array of scintillation detectors 10 with shielding 11 is provided on the opposite side of tube 2. This arrangement allows a number of beams 9 to be transmitted through a selected volume of the flow which includes substantially the full cross-section of the tube. The operation of the FIG. 6 embodiment is for practical purposes the same as for the first embodiment save for the processing of several channels of data.

The processing system developed for use with multiple detectors of the kind shown in FIGS. 4 to 6 can accommodate up to 15 scintillation detectors under computer control, giving values of R over time intervals of down to one millisecond.

Figure 7:
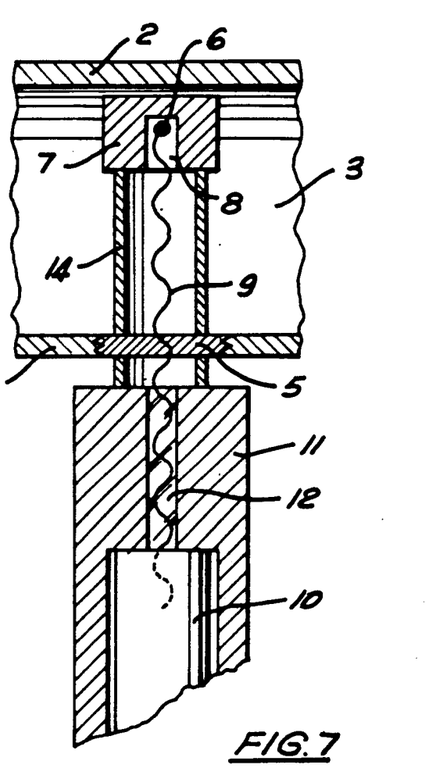
FIG. 7 is a view similar to FIG. 1 showing a fourth alternate embodiment of the dual energy gamma-ray transmission assembly.

FIG. 7 shows the major features of a fourth embodiment of an apparatus to measure flow velocity of the liquid component in an oil/water/gas mixture. This embodiment has the dual energy gamma-ray assembly in the form of a probe formed by the radioisotopes 6, source collimation and shielding 7, the window 5, and pillars 14 which provide rigid support. The probe is immersed into the main pipe stream of the oil, water and gas mixture. This arrangement is used when pipe diameters are so large that insufficient low energy gamma-rays penetrate the oil, water and gas mixture and hence the detected intensity of low energy gamma-rays cannot be measured accurately.

Although the foregoing describes the invention with particular reference to a three phase oil/water/gas mixture it is equally applicable to multiphase flows comprising at least two liquid phases. Thus the invention is also applicable to a flow consisting of two liquid phases or a gas and more than two immiscible liquid phases.

I claim:

1. A method for measuring liquid flow velocity of a multiphase flow containing at least two liquid phases, said method comprising:
   (i) passing said flow through a tube;
   (ii) measuring at a first location the intensities of gamma-rays transmitted through a first volume of said flow at two different gamma-ray energies, at least one of said gamma-ray energies having substantially different mass absorption coefficients in each of said two liquids, and obtaining a time varying measurement indicative of the ratio of the mass absorption co-efficients of the first volume at said two energies;
   (iii) measuring at a second location spaced from the first location in the direction of said flow the intensities of gamma-rays transmitted through a second volume of said flow at said two different gamma-ray energies and obtaining a time varying measurement indicative of the ratio of the mass absorption co-efficients of said second volume at said two energies;
   (iv) cross correlating the time varying measurements obtained at said first and second locations to derive a liquid flow transmit time; and
   (v) calculating said liquid flow velocity from the transit time and the spacing of said first and second locations.

2. A method for measuring the liquid mass flowrates of a multiphase flow containing at least two liquid phases, comprising:
   (i) passing said flow through a tube;
   (ii) measuring at a first location the intensities of gamma-rays transmitted through a first volume of said flow at two different gamma-ray energies, at least one of said gamma-ray energies having substantially different mass absorption coefficients in each of said two liquids and obtaining a time varying measurement indicative of the ratio of the mass absorption co-efficients of the first volume at said two energies;
   (iii) measuring at a second location spaced from the first location in the direction of said flow the intensities of gamma-rays transmitted through a second volume of said flow at said two different gamma-ray energies and obtaining a time varying measurement indicative of the ratio of the mass absorption co-efficients of said second volume at said two energies;
   (iv) cross correlating the time varying measurements obtained at said first and second locations to derive a liquid flow transit time;
   (v) calculating the liquid flow velocity from the transit time and the spacing of said first and second location; and
   (vi) determining the component fractions of each liquid phase in said flow and calculating each liquid mass flowrate from said liquid flow velocity and component fractions.

3. A method as claimed in claim 2 wherein said component fractions of each liquid are determined using a dual energy gamma-ray transmission technique.

4. A method as claimed in claim 1 or claim 2 wherein the cross correlation is performed with respect to a time varying measurement of $$R = \frac{\ln(I'/I_o')}{\ln(I''/I_o'')}$$

at each of said first and second locations where
- $I'$ = intensity of gamma-rays of said first energy passing through said first or second volume with said flow passing through the tube;
- $I_o'$ = intensity of gamma-rays of said first energy passing through said first or second volume with the tube empty;
- $I''$ = intensity of gamma-rays of said second energy passing through said first or second volume with said flow passing through the tube; and
- $I_o''$ = intensity of gamma-rays of second energy passing through said first or second volume with the tube empty.

5. A method as claimed in claim 1 or claim 2 wherein said first and second volumes include substantially the full cross-section of said tube.

6. A method as claimed in claim 1 or claim 2 wherein said measuring of the intensities of gamma-rays transmitted through each of said first and second volumes is performed by disposing a gamma-ray source within said tube.

7. A method as claimed in claim 1 or claim 2 wherein said measuring of the intensities of gamma-rays transmitted through each of said first and second volumes is performed by alternate measurement over a short time interval at each of said gamma-ray energies.

8. A method as claimed in claim 7 wherein said time interval is from 1 to 5 milliseconds.

9. A method as claimed in claim 1 or claim 2 wherein said measuring of the intensities of gamma-rays transmitted through said first and second volumes is performed using a plurality of spaced apart gamma-ray detectors.

10. A method as claimed in claim 1 or claim 2 wherein said multiphase flow contains a gas phase.

11. An apparatus for measuring liquid flow velocity of a multiphase flow containing at least two liquid phases, comprising: a tube through which said flow is passed; first gamma-ray transmission means for measuring at a first location the intensities of gamma-rays transmitted through a first volume of said flow at two different gamma-ray energies, at least one said gamma-ray energies having substantially different mass absorption coefficients in each of said two liquids, and obtaining a time varying measurement indicative of the ratio of the mass absorption co-efficients of the first volume at said two energies; second gamma-ray transmission means for measuring at a second location spaced from the first location in the direction of said flow the intensities of gamma-rays transmitted through a second volume of said flow at said two different gamma-ray energies and obtaining a time varying measurement indicative of the ratio of the mass absorption co-efficients of said second volume at said two energies; and means for cross correlating the time varying measurements obtained at said first and second locations and producing a liquid flow transit time and calculating said liquid flow velocity from the transit time and the spacing of said first and second locations.

12. An apparatus for measuring the liquid mass flowrates of a multiphase flow containing at least two liquid phases, comprising:
a tube through which said flow is passed; first gamma-ray transmission means for measuring at a first location the intensities of gamma-rays transmitted through a first volume of said flow at two different gamma-ray energies, at least one said gamma-ray energies having substantially different mass absorption coefficients in each of said two liquids, and obtaining a time varying measurement indicative of the ratio of the mass absorption co-efficients of the selected volume at said two energies; second gamma-ray transmission means for measuring at a second location spaced from the first in the direction of said flow the intensities of gamma-rays transmitted through a second volume of said flow at said two different gamma-ray energies and obtaining a time varying measurement indicative of the ratio of the mass absorption co-efficients of said second volume at said two energies; means for cross correlating the time varying measurements obtained at said first and second locations and producing a liquid flow transit time and calculating the liquid flow velocity from the transit time and the spacing of said first and second locations; and
means for determining the component fractions of each liquid phase in said flow and calculating each liquid mass flowrate from said flow velocity and component fractions.

13. An apparatus as claimed in claim 11 or claim 12 wherein each of said first and second volumes includes substantially the full cross-section of the tube.

14. An apparatus as claimed in claim 11 or claim 12 wherein each of said gamma-ray transmission means comprises a gamma-ray source and a gamma-ray detector disposed on opposite sides of said tube.

15. An apparatus as claimed in claim 14 further comprising gamma-ray shielding associated with said source for directing gamma-rays from said source to said detector in a beam narrow in at least the direction of the flow.

16. An apparatus as claimed in claim 15 wherein said tube includes windows formed of a low atomic number material for transmission of said gamma-rays.

17. An apparatus as claimed in claim 15 wherein each of said gamma-ray transmission means comprises a plurality of spaced apart gamma-ray detectors.

18. An apparatus as claimed in claim 14 wherein said tube includes windows formed of a low atomic number material for transmission of said gamma rays.

19. An apparatus as claimed in claim 14 wherein each of said gamma-ray transmission means comprises a plurality of spaced apart gamma-ray detectors.

20. An apparatus as claimed in claim 19 wherein each of said gamma-ray transmission means comprises a plurality of gamma-ray sources and a plurality of detectors arranged in a linear array to detect gamma-rays from the plurality of sources.

21. An apparatus as claimed in claim 19 wherein each of said gamma-ray transmission means comprises a gamma-ray source and a plurality of detectors spaced apart around an arc to detect gamma-rays from said source.

22. An apparatus as claimed in claim 11 or claim wherein each of said gamma-ray transmission means comprises a gamma-ray source disposed within said tube and a gamma-ray detector disposed outside said tube.

* * * * *